US011055867B2

(12) United States Patent
Dableh (10) Patent No.: US 11,055,867 B2
(45) Date of Patent: Jul. 6, 2021

(54) AUTOMATIC LIGHT POSITION DETECTION SYSTEM

(71) Applicant: JDRF Electromag Engineering Inc., Oakville (CA)

(72) Inventor: Roumanos Dableh, Oakville (CA)

(73) Assignee: JDRF Electromag Engineering Inc., Oakville (CA)

(*) Notice: Subject to any disclaimer, the term of this patent is extended or adjusted under 35 U.S.C. 154(b) by 751 days.

(21) Appl. No.: 15/584,639

(22) Filed: May 2, 2017

(65) Prior Publication Data

US 2018/0322649 A1 Nov. 8, 2018

(51) Int. Cl.
| | | |
|---|---|---|
| *G06T 7/60* | (2017.01) |
| *G01B 11/00* | (2006.01) |
| *H05B 47/175* | (2020.01) |
| *F21V 17/02* | (2006.01) |
| *G02B 26/08* | (2006.01) |
| *G03B 21/00* | (2006.01) |
| *G05B 19/19* | (2006.01) |
| *G05B 19/402* | (2006.01) |
| *H04B 7/24* | (2006.01) |

(52) U.S. Cl.
CPC ............. *G06T 7/60* (2013.01); *F21V 17/02* (2013.01); *G01B 11/00* (2013.01); *G02B 26/0816* (2013.01); *G03B 21/00* (2013.01); *G05B 19/19* (2013.01); *G05B 19/402* (2013.01); *H04B 7/24* (2013.01); *H05B 47/175* (2020.01)

(58) Field of Classification Search
CPC .......... G06T 7/60; F21V 17/02; G01B 11/00; G02B 26/0816; G03B 21/00; G05B 19/19; G05B 19/402; H04B 7/24; H05B 37/0245

USPC ........................................................ 702/150
See application file for complete search history.

(56) References Cited

U.S. PATENT DOCUMENTS

| | | | |
|---|---|---|---|
| 8,346,376 B2 | 1/2013 | Engelen et al. |
| 9,215,775 B1 | 12/2015 | Lunn et al. |
| 9,681,521 B2* | 6/2017 | Arulandu ............. H05B 47/155 |
| 10,028,358 B2 | 7/2018 | Ogg et al. |
| 2006/0244719 A1* | 11/2006 | Brigham, II ........ G06F 3/03542 |
| | | | 345/156 |

(Continued)

FOREIGN PATENT DOCUMENTS

| | | |
|---|---|---|
| AU | 20113164520 | 4/2012 |
| CN | 101869004 | 10/2010 |

(Continued)

*Primary Examiner* — John E Breene
*Assistant Examiner* — Xiuqin Sun
(74) *Attorney, Agent, or Firm* — DLA Piper LLP (US); Timothy Lohse (57) ABSTRACT

A device that is capable of determining its relative position with regard to another device. The device accomplishes this by receiving and analyzing two sets of information emitted by the device whose unique identifier and relative position is to be determined. The first set of information received by the device includes a structured light pattern with a known geometric configuration reflected off a surface in view of both devices. The second set of information received by the device includes a digital communication signal that encodes the unique identifier of the emitting device. Both sets of information may be transmitted on a free space optical communication channel that can be non-directed and non-line of sight.

13 Claims, 6 Drawing Sheets

(56) References Cited

U.S. PATENT DOCUMENTS

| | | | |
|---|---|---|---|
| 2007/0160373 A1* | 7/2007 | Biegelsen | H05B 37/0245 |
| | | | 398/118 |
| 2011/0089841 A1 | 4/2011 | Radermacher et al. | |
| 2012/0059622 A1 | 3/2012 | Cacace et al. | |
| 2012/0120375 A1* | 5/2012 | Kilcher | G01S 7/4814 |
| | | | 353/98 |
| 2013/0314597 A1* | 11/2013 | Kumamoto | H04N 5/7475 |
| | | | 348/552 |
| 2017/0067734 A1* | 3/2017 | Heidemann | G01B 11/2545 |

FOREIGN PATENT DOCUMENTS

| | | |
|---|---|---|
| CN | 102273323 | 12/2011 |
| WO | WO2010079388 A1 | 7/2010 |
| WO | WO 2014/147510 | 9/2014 |
| WO | WO 2015/189118 | 12/2015 |

* cited by examiner

AUTOMATIC LIGHT POSITION DETECTION SYSTEM

FIELD

This invention relates to the automatic detection and determination of fixture locations. More specifically, the invention relates to determining the relative position of fixtures.

BACKGROUND

A floor plan can be an effective visual tool used in the graphical user interfaces of building automation, space utilization, indoor way-finding and indoor positioning systems. Floor plans are typically produced by architects or designers during the design and construction phase of the building. However, they generally do not include the accurate location of the components used by lighting systems, especially when systems are added or modified after the initial design phase of a building.

Consequentially, each system provider must produce, validate and maintain a distinct set of floor plans showing the location of the components. Often, providers use different software applications and floor plans cannot be easily shared, placing an added burden on building managers who already face a high degree of effort to maintain accurate floor plans throughout the life-cycle of a building.

Often much of the effort is spent manually ensuring that physical location of a device is correctly illustrated on a floor plan by comparing drawings to a physical space. In the case of a large building, the lighting control system may have thousands of sensors, luminaires and other control devices that must be accurately represented on the floor plan.

SUMMARY

This invention is directed to automatically determining the relative locations of lighting fixtures. Once the relative locations are determined, the locations can be indicated on an appropriate floor plan. The relative locations can be determined using structured light and coordination between light fixtures.

BRIEF DESCRIPTION OF THE DRAWINGS

In drawings which illustrate by way of example only,

FIG. 5A to 5I are schematic views by a receiving device of structured light emitted by an emitting device.

DETAILED DESCRIPTION

To determine relative positions of lights, structured light projection and communications between the lights is used.

Structured light is a technique that uses a device with a light source to project a structured pattern of light onto an object. A structured pattern of light may be any projection of patterned light that can be detected and identified, such as a grid, or arcs of light and dark areas. The structured light pattern may be reflected off the floor, ground or other objects and may be captured by an image sensor of a receiving device. The device that projects the light and the device that receives the reflected image may be different and can be located some distance apart.

The receiving device performs geometric analysis on the received image to identify the structured light in order to determine the distance between the receiving device and the object. It does this by determining the position and portion of the structured light projection is within the receiving device's view.

In other applications of structured light, the system may know the relative position of the projector and the receiver and the projected structured light is used to determine the distance from the projector and receiver to the object reflecting the structured light or the shape of the object reflecting the structured light. For example, the Nintendo Wii used structured infrared light to determine the position and movement of the player relative to a combination light emitter/receiver. In the presently described system, the relative position of the projector and receiver is not initially known but may be determined using the structured light.

Time of flight methods use the known speed of light to determine the distance between two points. It may require that light travel from an emitter and return to a receiver that is co-located with the emitter, typically by reflecting the light off an object. A calculation is done on the time it takes the light to travel from the emitter, reflect off the object and be detected, to determine the distance the light has travelled. This may be done by multiplying the time by the speed of light and dividing by two to account for the light travelling the distance twice.

While time of flight methods may be used for several applications, in an embodiment, it may be used for measuring the distance from a fixture to a reflective plane, such as a floor or table. This distance may be used to determine the ceiling height where the fixture is mounted and used to calibrate the structured light detection.

Figure 1:
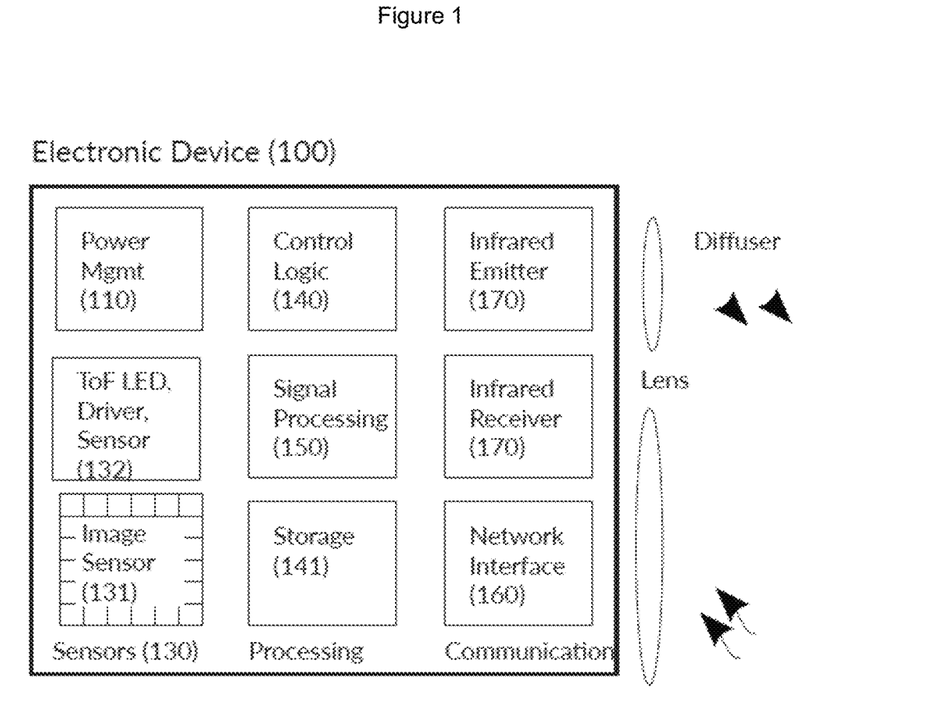
FIG. 1 a schematic view of a device that determines the unique identifier and relative position in accordance with an embodiment of the invention.

With reference to FIG. 1, a schematic view of a device that determines the identifier and relative position of one or more devices. The device may project a structured light image and communicate with other similar devices. The device may communicate using the transmission and receiving of signals with other similar devices. The communication signals may use infrared light and the devices may use lens such as a diffuser and collector for the communication signals. The device may transmit and receive signals using other communication signals such as wired, Bluetooth, NFC, Wi-Fi in addition to, or instead of infrared light. The devices may form a decentralized network by communicating from device to device using node-to-node communications, such as using infrared. This node-to-node communication may be a peer-to-peer network with no centralized control.

A unique identifier for each device may be communicating to other devices nearby or within the same group. An infrared light communication signal may self-limit such communications to devices physically close to the emitting device. Alternative types of communications signals, such as Wi-Fi, are longer range may include more devices within neighbouring devices. The Electronic device 100 may include the following subsystems: power management circuitry 110, various sensors 130, including but not limited to image sensor 131, time of flight sensor 132, control logic processing 140, data storage and memory 141, digital signal processing 150, network communication interface 160, visible or infrared communication emitter and receiver circuitry 170.

The power management circuitry 110 may convert the available power supply for use by the device, such as converting mains power to a lower voltage power. The circuitry 110 may connect to solar, EM energy harvester or other power sources. It may manage and adjust the power usage and power storage, on for example, batteries, depending on the power supply and usage.

Figure 2:
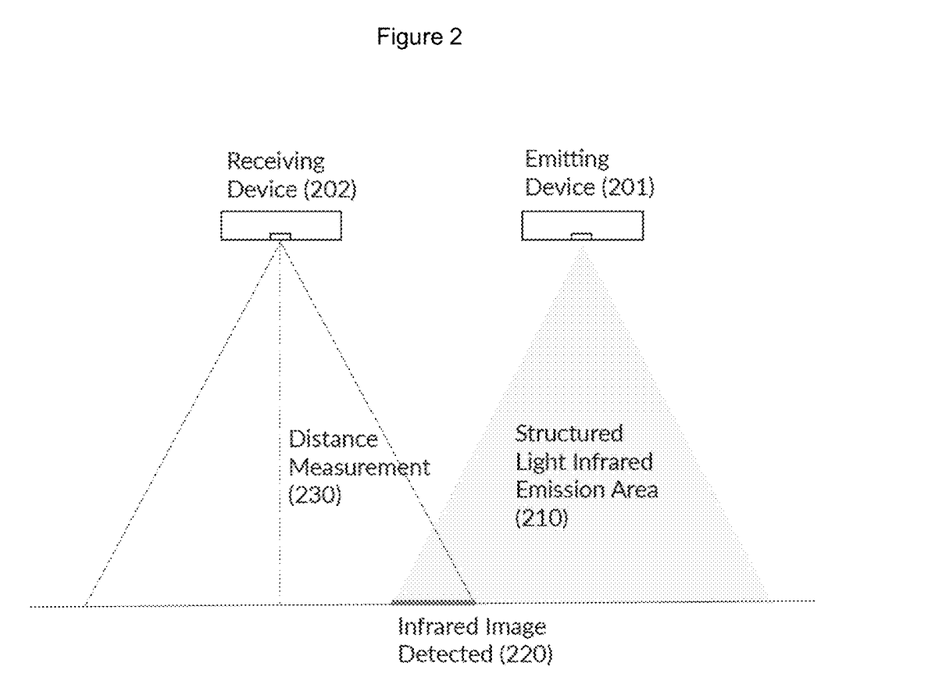
FIG. 2 is a schematic view of two devices in an embodiment of the invention mounted to a ceiling.

FIG. 2 is an illustration of front view of two devices, an emitting device 201 and a receiving device 202, mounted to a ceiling. The emitting device 201 may project a structured light image 210 onto the floor. The device 201 may use LEDs, lasers or other light emitting elements to project light on to the floor. The structured light may also be projected on other objects below the device such as tables, desks, chairs or even people.

A portion of the structured light image 220 may be reflected to the receiving device 202. Only a portion 220 of the projected image may be within the field of view of the image sensor of the receiving device. The receiving device may use a wide angle lens or detector to permit a large viewing angle. Using the detection of the full or partial view of the structured light, the receiving device may determine its relative position with respect to the emitting device.

The receiving device may determine which portion of the structured light image it can detect and the position of the structured light with regards to the device's location. If the distance from the device to the structured image is known, either from a time of flight sensor, or from being provided the height, the receiving the device can determine the expected size of the projected structured light image. If the distance of the device from the structured image is not known, the receiving device may estimate the distance from the size or spacing of the projected image. For example, if the projected structured light is in the form of a grid, the receiving device may determine the spacing of the grid lines. If the spacing of the grid lines is determined and assuming the distance of the projected light image from both the emitter or receiver device is known, the distance can be determined by the device.

The time of flight sensor in the receiving device may be used to measure the distance between the receiving device and the reflecting geometric plane, in some cases, the floor. The distance from the receiving device and the reflecting geometric plane on which the structured image is projected may be used to assist with identifying the structured light pattern.

While FIG. 2 shows device 201 emitting the structured light and device 202 receiving the structured light, at times, device 202 may emit the structured light and 201 may receive the structured light. By having a first device detect the structured light projected by a second device and having the second device detect the structured light of the first device, the determination of the relative positions can be made more accurately, the system may be more accommodating of objects, such as tables and chairs, interfering with the projected light and allow for the position determination to occur with respect to additional devices.

Figure 3:
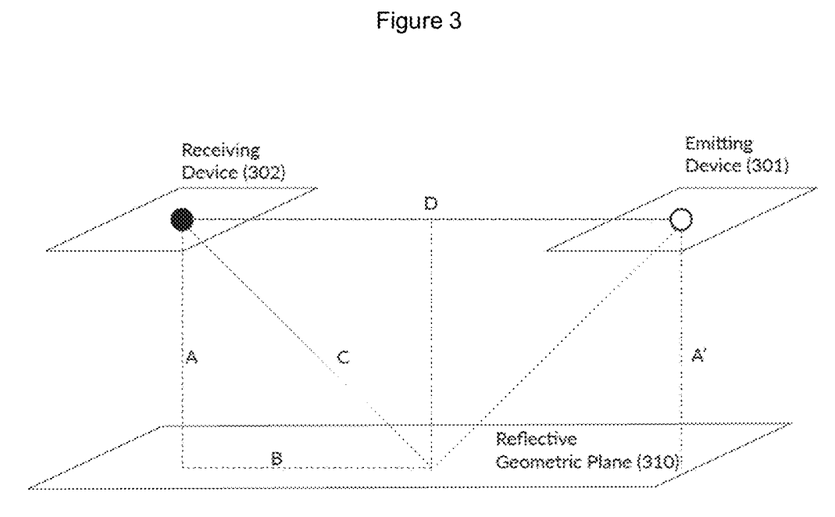
FIG. 3 is a schematic view of two devices in an embodiment of the invention mounted to a ceiling indicating some of the geometry.

FIG. 3 shows a perspective view of the distance (D) between the emitting device 301 and the receiving device 302 relative to the geometric plane used to reflect the structured light image. Initially, D may not be known. The distance between the receiving device to the geometric plane 310 is denoted by A. The distance along the geometric plane and starting from a point directly beneath the receiving device and ending at the reflection point of the projected image is denoted by B. The hypotenuse between lines A and B is denoted by C. The emitting device and receiving device do not need to be on the same plane.

Through the use of the projection of structured light, the distance D between devices 302 and 301 may be determined. Time of flight sensors may be used to determine the distances A and A'.

Figure 4:
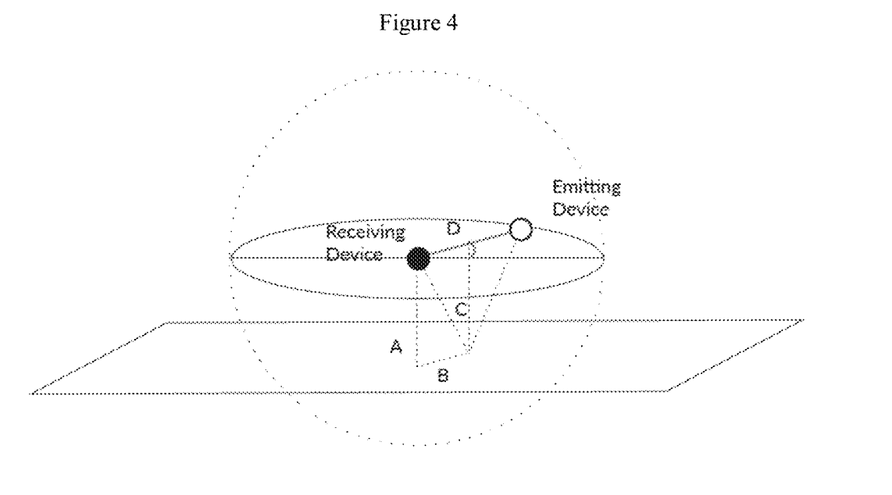
FIG. 4 is a schematic view of two devices in an embodiment of the invention mounted to a ceiling indicating some further geometry.
Figure 5A:
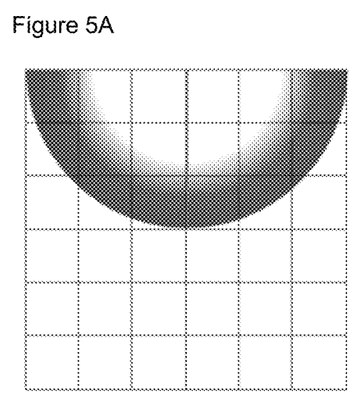
Figure 5B:
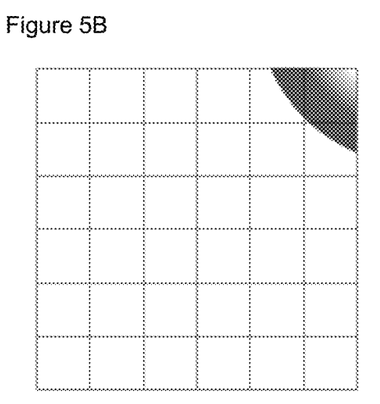
Figure 5C:
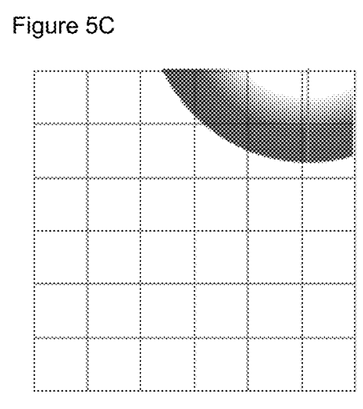
Figure 5D:
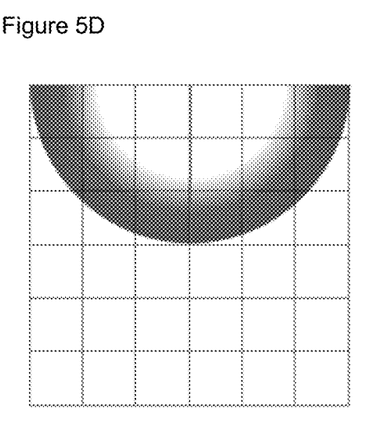
Figure 5E:
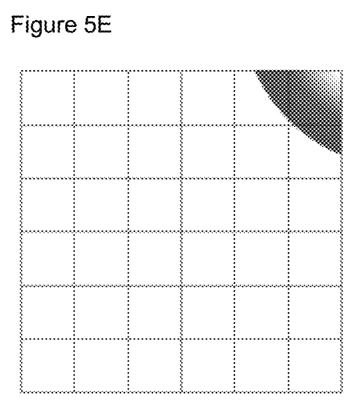
Figure 5F:
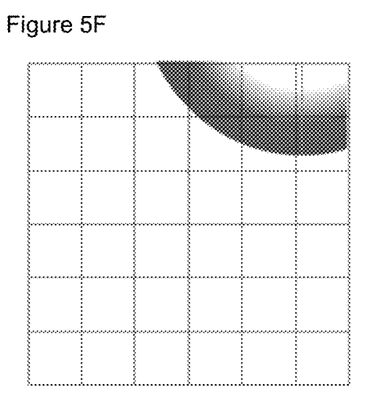
Figure 5G:
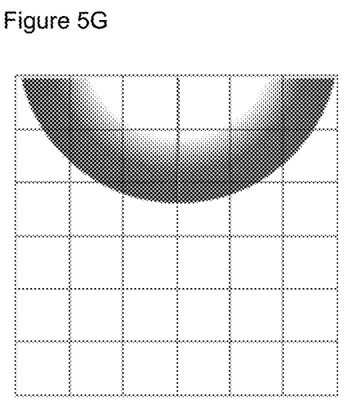
Figure 5H:
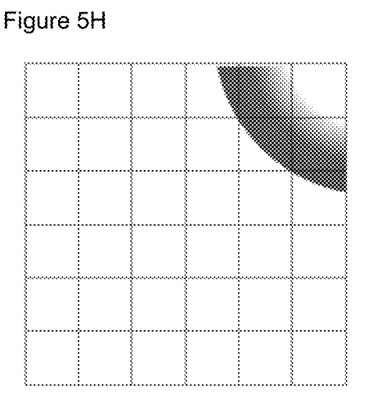
Figure 5I:
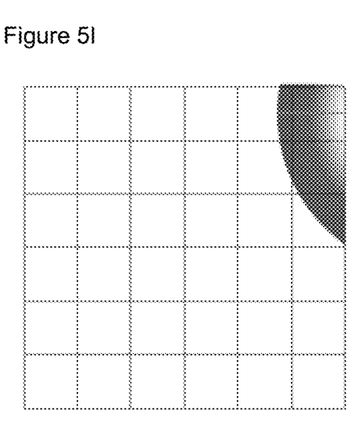

FIG. 4 shows a perspective of the angle between the emitting device and receiving device along a common plane as well as the distance (D) between them. The angle is not known initially. Through the use of the projection of structured light, the distance D and the angle may be determined.

FIGS. 5A through 5I shows a series of representations of the section of the structured light image received by the image sensor of the receiving device. The geometric configuration of the received image depends on the relative position (distance and bearing) between the emitting device and the receiving device. As an example, the structured light is a circle with a light/dark gradient with the centre of the circle directly below the emitting device. A receiving device may use the sign of the detected arc, and the portion of the arc it can detect to determine the centre of the projected structured light and hence the relative position of the device emitting the light.

A network of electronic devices 100 may each contain at least communication circuitry 170, light emitter and receiver circuitry 170 capable of projecting structured light, image sensing circuitry 131 and distance measurement circuitry 132. Each device 100 can be mounted on the ceiling or on a ceiling mounted luminaire or other building automation component. Each device may collect a set of distance and bearing measurements from itself to neighboring devices by detecting structured light projected by its neighbouring devices.

Figure 6:
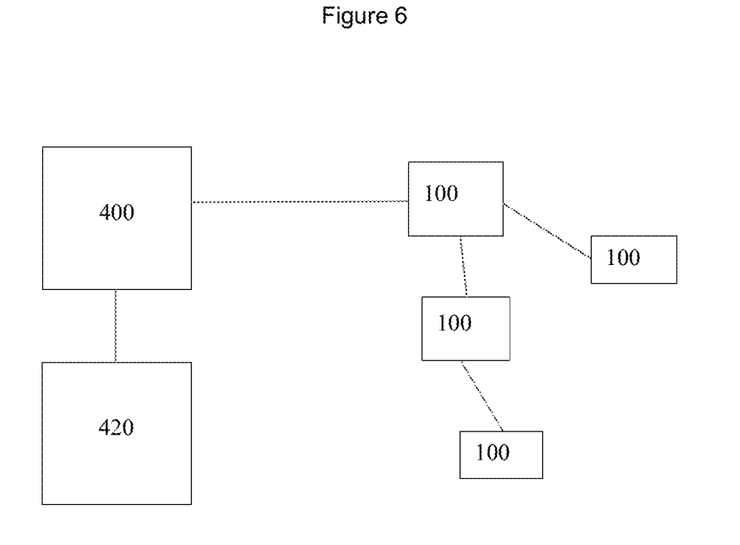
FIG. 6 is a schematic view of several devices connected over a peer-to-peer network with a controller and application.

With reference to FIG. 6, this data may be shared with other devices, a central controller 400 or publish to an application 420. Each device may communicate directly with the controller 400 or they may communicate via a peer-to-peer network between devices 100. The application 420 may collect data published by all the devices 100 and use the collective set of relative coordinates to calculate, display or render the relative positions of the devices and preferably the floor-plan. The relative positions or floor plan may be viewable on a mobile device, or computer running a web browser.

The image of sensing circuitry may consist of a low resolution pixel array that may analyze the structured light pattern projected by other devices and visible within its field of view. In an embodiment, only one device may project its structured light at a time. The devices may communicate with each other to ensure that only one device is projecting its light at a time. In another embodiment, multiple devices may project simultaneously, and preferably, the structured light is unique to each device.

In an embodiment, a low resolution image sensor is used to detect the structured light. In this way, the image sensor cannot inadvertently capture sensitive information from people, activities or documents under the device. This may reduce concerns about potential invasions of privacy, and cybersecurity.

By combining the height measurement with analysis of each received projected image, the distance and orientation from each device to all devices within its field of view can be determined. The height of the device from the projecting surface may be compared to the size of the projected structured image. The further the detecting device is from the reflecting surface, the smaller the structured light will appear to be. The location of the structured light within a device's field of view is used to determine the relative angle and distance to the emitting device.

With reference to FIG. 3, the height measurement determines A. The detection of the structured light is used to calculate the distance B. The combination of A and B can be used to determine distance D.

With reference to FIG. 6, a structured light sensor of a device may detect only a portion of the structured light emitted by a neighbouring device in its field of view. For example, image (a) would indicate that the neighbouring emitting device is directly north from the detecting device. Similarly, image (b) indicates that the emitting device is north east of the detecting device. Image (c) also indicates that the emitting device is north-east but is closer than the emitting device of (b). The directions, north, north-east, etc. are provided as labels relative to the images indicated in FIG. 6. In an embodiment, the detecting device may have no detection of the absolute direction to neighbour devices. The use of structured light in this way can be used to determine the relative direction of neighbouring devices. In an embodiment, one or more device may include a compass, or GPS receiver to provide an absolute direction and/or location.

For example, device A may be able to detect the structured projected image of device B, and device B may be able to detect the structured projected image of device C. Using the structured projected image, device A may be able to determine its relative position with respect to B and similarly B determine its relative position with respect to C. Using this information and communicating the relative positions to either other devices in a peer-to-peer manner, or communicating the information to a central application, the relative position of A and C can be determined.

A similar determination may be made with additional devices which can detect the projected images of at least one of the devices. If a device can detect the projected image of multiple devices, the determination of its relative position may be more accurate.

Devices may be distinguished from one another by encoding a unique identifier in an infrared communication signal to communicate to neighbouring devices that it is projecting its structured light. Each device may collect a set of data containing the relative distance and bearing measurements for each neighboring device that it detected, along with their unique identification number.

The software application may be able to plot all devices which can see each other's structured light patterns onto a floor plan using the relative coordinate system received by each device. If an absolute position and/or absolute direction is known, the orientation and position of the system of devices may be determined or fixed. A controller or operator may re-map or place additional devices on the floor plan if some devices are not within visible range of another device. For example, devices in a small room may determine the relative positions of themselves but have no ability to communicate with or detect the projected images of other devices.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A positioning electronic device comprising:
   a projector for projecting a structured light pattern on a reflective surface;
   an image sensor for detecting all or part of one or more reflected structured light patterns projected using a projector of a second positioning electronic device;
   a communications transceiver for transmitting and receiving communication signals to one or more other positioning electronic devices;
   a distance detector for detecting the distance from the electronic device to the reflecting surface; and
   a control logic processor for determining a relative position of the positioning electronic device relative to the second positioning electronic device using the detected reflected structured light patterns and the distance detected by the distance detector, and communicating the relative position using the communications transceiver;
   wherein the structured light pattern is a pattern known to the receiving device and wherein the control logic processor calculates the relative position using the expected appearance of the reflected structured light pattern and the actual appearance from the image sensor.

2. The electronic device of claim 1 wherein only one neighbouring device projects a structured light pattern and an identifier of the electronic device is received at the communication transceiver so that the controller can identify the electronic device projecting the structured light pattern detected by the image sensor.

3. The electronic device of claim 1 wherein the communications transceiver is an infrared transceiver.

4. The electronic device of claim 1, wherein the image sensor detects a unique identifier in the detected structured light pattern projected by an electronic device, the unique identifier, identifying the electronic device projecting the structured light pattern.

5. The electronic device of claim 1 wherein the control logic processor communicates the relative positions of one or more electronic devices to a central controller.

6. The electronic device of claim 1 wherein the electronic device is a light fixture.

7. A method of determining a relative position of a first device and a second device, the method comprising:
   projecting a first structured light pattern on a reflective surface from the first device;
   detecting a portion of the first structured light pattern using an image sensor of the second device;
   detecting a distance from the electronic device to the reflective surface with a distance detector;
   determining the relative position of the first device and the second device based on the portion of the first structured light pattern detected by the second device and the distance detected by the distance detector; and
   communicating the relative position from the second device to the first device;
   wherein the structured light pattern is a pattern known to the receiving device and wherein determining the relative position uses the expected appearance of the reflected structured light pattern and the actual appearance from the image sensor.

8. The method of claim 7, wherein the first and second electronic devices are light fixtures mounted to a ceiling.

9. The method of claim 7 further comprising:
projecting a second structured light pattern on the reflective surface from the second device;
detecting a portion of the second structured light pattern using an image sensor of the first device;
determining the relative position of the first device and the second device based on the portion of the second structured light pattern detected by the first device; and
comparing the relative position measure by the first device and the second device to improve accuracy.

10. The method of claim 9 further comprising additional electronic devices projecting and detecting structured light patterns, determining which portion of the structured light patterns was detected and the relative positions of the devices, and communicating the relative positions to the other electronic devices.

11. The method of claim 9 wherein only one device projects a structured light pattern and communicates an identifier of the electronic device to the other electronic devices so the other electronic devices can identify which device is projecting the structured light.

12. The method of claim 7, where the communicating uses an infrared transceiver.

13. The method of claim 7 wherein the relative position of the electronic devices is further communicated to a central controller.

* * * * *